United States Patent [19]

Fouad

[11] Patent Number: 5,184,280
[45] Date of Patent: Feb. 2, 1993

[54] POWER RECTIFIER WITH FLEXIBLE STACKED SHEAVE BUS BAR FOR HIGH CURRENT CARRYING CONNECTIONS

[75] Inventor: Fakhry A. Fouad, Plano, Tex.

[73] Assignee: AT&T Bell Laboratories, Murray Hill, N.J.

[21] Appl. No.: 786,236

[22] Filed: Oct. 31, 1991

[51] Int. Cl.⁵ ............................................. H02B 1/20
[52] U.S. Cl. .................................. 361/361; 174/72 B; 361/355; 361/379; 361/407
[58] Field of Search ........................... 174/72 B, 254; 361/341–342, 361, 355, 379, 398, 407

[56] References Cited

U.S. PATENT DOCUMENTS

| | | | |
|---|---|---|---|
| 4,178,624 | 12/1979 | Wilson et al. | 361/341 |
| 4,845,592 | 7/1989 | Himes, Jr. et al. | 361/407 |
| 4,905,123 | 2/1990 | Windle et al. | 361/407 |
| 5,053,920 | 10/1991 | Staffiere et al. | 361/407 |

Primary Examiner—Gregory D. Thompson
Attorney, Agent, or Firm—A. G. Steinmetz

[57] ABSTRACT

A bus bar comprised of a layered stack of flexible conductive planar leaf conductors, with sufficient cross-sectional current carrying capacity, is used in a bulk rectifier for conducting heavy currents between components. The bus bar is amenable to being easily coupled to mounting structures having mounting pad planes at different levels and angular positions. It is normally uninsulated and hence heat exchange is enhanced compared with traditional insulated cable. This permits the bus bars to operate at a relatively low temperature.

10 Claims, 4 Drawing Sheets

POWER RECTIFIER WITH FLEXIBLE STACKED SHEAVE BUS BAR FOR HIGH CURRENT CARRYING CONNECTIONS

FIELD OF THE INVENTION

This invention relates to heavy current carrying conductors and in particular to a stacked multiple sheave bus bar arrangement for bulk power processing equipment.

BACKGROUND OF THE INVENTION

Bulk power processing equipment must handle large current values both at the external terminals and internally between the components of the power processing circuitry. These internal components must be connected with conductors having a high current carrying capacity. Normally these components are interconnected with cable constructed of stranded conductors with terminal lugs at each end. These cables supply the necessary current carrying capacity. However the required size of these cables results in a rather thick cable which is not very pliable or flexible. Often the components to be interconnected have connection points in planes that are skewed relative to each other. As a result the installation of this cable between components in assembling the power processing equipment is a difficult and time consuming hand operation. This difficulty in assembly translates into increased cost and reduced profits.

SUMMARY OF THE INVENTION

A bus bar comprised of a layered stack of flexible conductive planar leaf conductors, with sufficient total cross-sectional current carrying capacity, is used in a bulk rectifier for conducting heavy currents between components. The bus bar is amenable to being easily coupled to mounting structures having mounting pad planes at different levels and angular positions.

DETAILED DESCRIPTION

Heavy current carrying bus connections used in high power bulk power processing equipment such as rectifiers of a battery plant have traditionally used stranded cable with terminal lugs to interconnect components within the bulk power supply. Use of stranded cable was necessitated by the fact that the initiating and termination point of the connection occurred in different planes and angular positions with respect to each other. Stranded cable, capable of carrying very high currents, (i.e. 400 amps) is difficult to handle and at the high power levels required is not as flexible as desired to facilitate ease of installation in manufacturing the bulk power processing units. The stranded cable has insulation material which prevents ventilation of the stranded conductors of the cable which may cause the cable to operate at high temperature.

Figure 1:
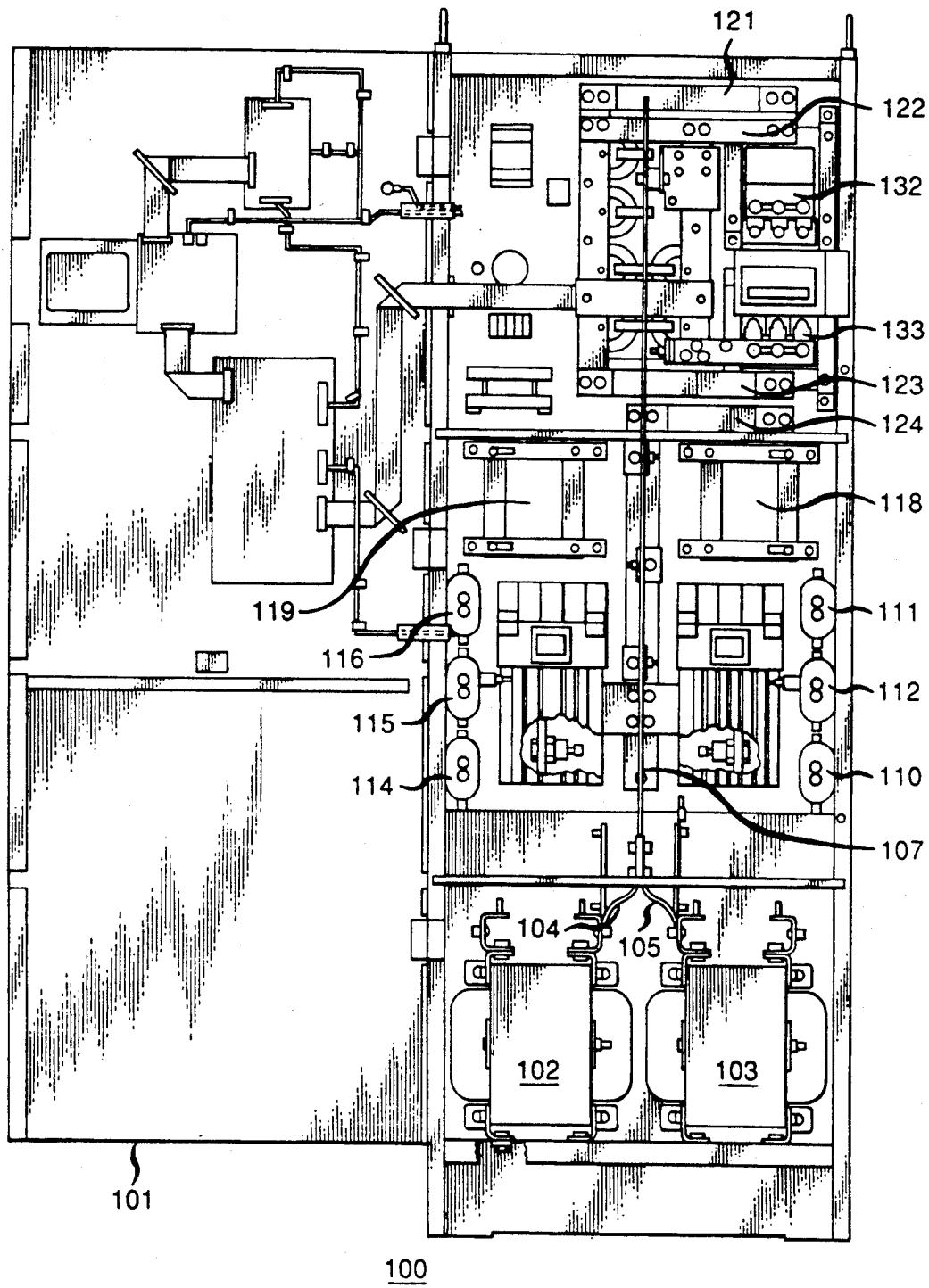
FIG. 1 is an elevation view of a bulk power processor to which the invention may be applied.

A high power rectifier of a battery plant which supplies charging current to reserve batteries in a telephone central office is shown in FIG. 1. The particular rectifier in the illustrative embodiment is a three phase input line voltage, 480/208/240 Vac, floor mounted, ferroresonant, rectifier which provides 400 A dc at 54 volt power for telephone equipment. The unit, mounted in a cabinet 100, is shown in an elevation view with the cabinet door 101 open. Two ferro transformers 102 and 103 are connected by the flexible bus bars 104 and 105 to a central vertical bus 107 in the center of the unit.

The bulk power supply also includes the ac capacitors 110–112, 114–116 and the two regulating inductors 118 and 119. Additional flexible bus bars 121, 122, 123 and 124 are shown providing interconnections between the bus 107 to dc output filter inductor 132.

Figure 2:
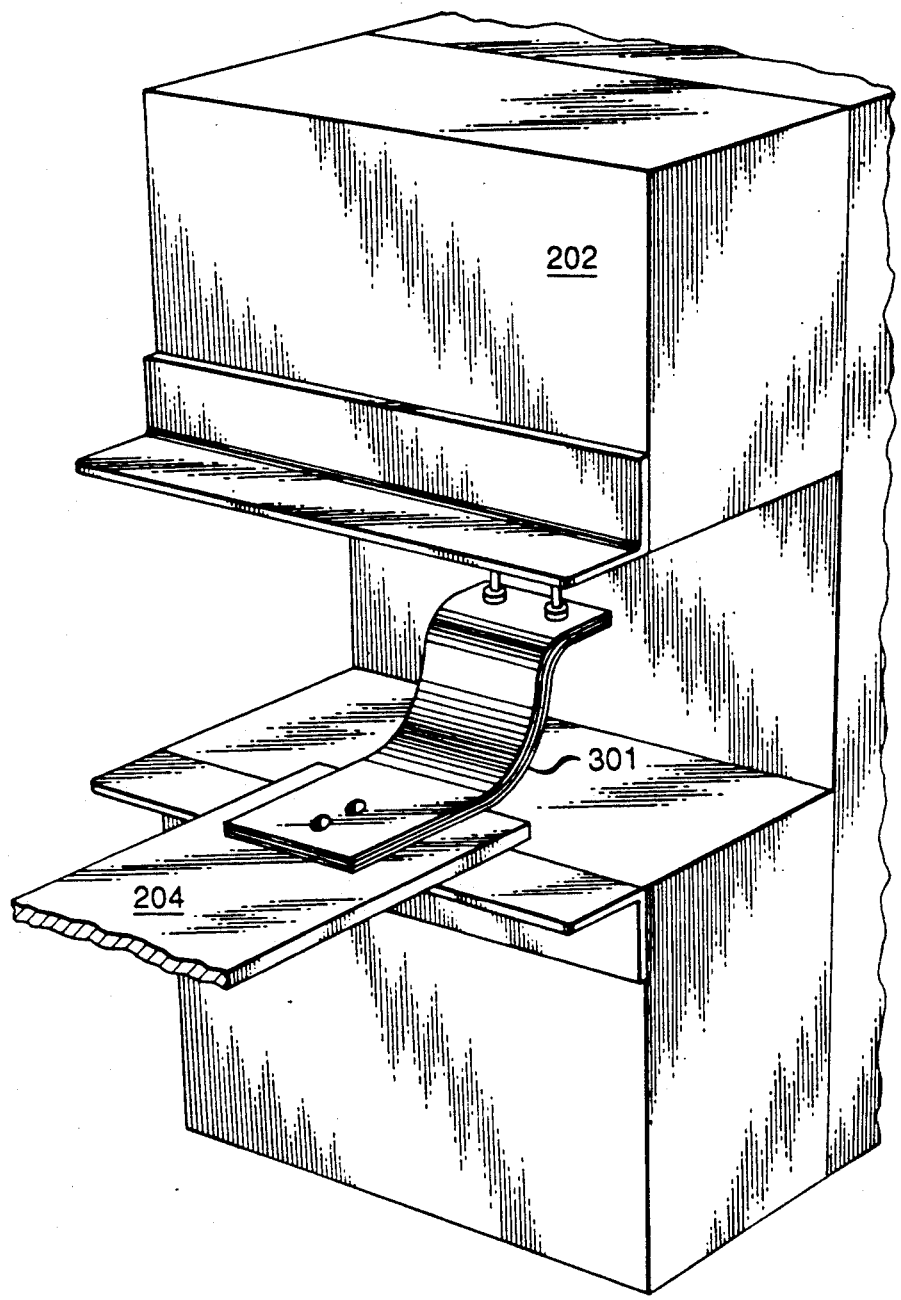
FIG. 2 is pictorial view of an application of the bus bar in accord with the principles of the invention.
Figure 3:
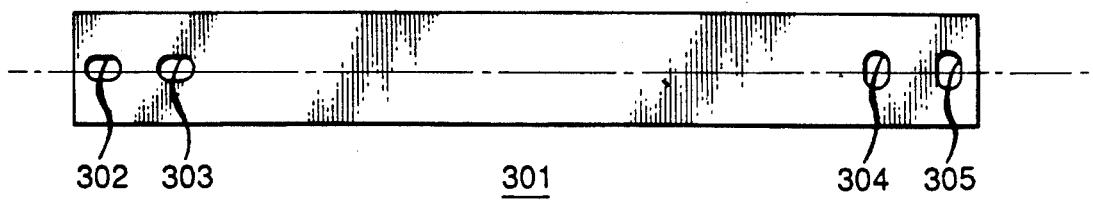
FIGS. 3 and 4 show planar views of two forms of the individual leaves of the flexible bus bar, respectively.

A fragmentary pictorial detail of the interconnection of ferro transformers to the central vertical bus is shown in FIG. 2. A flexible bus bar 301, as shown in FIG. 3, is shown connecting one of the ferro transformers 202 to the central vertical bus 204. As shown, the flexible bus bar is laminated from a plurality of individual conductive leaves and is bolted to a portion of the ferro transformer. It may be similarly bolted or welded to the vertical central bus 204.

Figure 4:
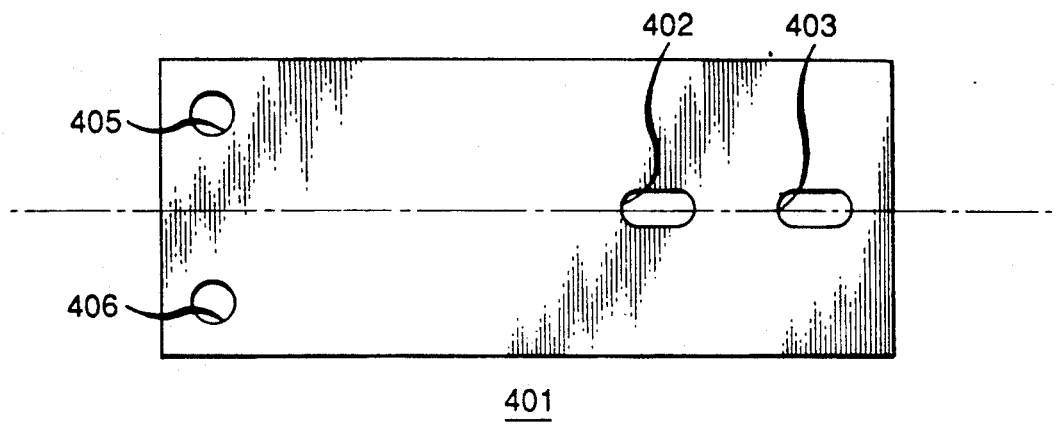

The structure of the individual leaves of the flexible bus bars is shown in the FIGS. 3 and 4. The individual leaves 301 and 401 shown in FIGS. 3 and 4, respectively, are constructed of a highly conductive soft copper material. Leaf 301 includes two oblong holes 302 and 303 at one end located astride a longitudinal axis of the leaf and being oriented with their long dimension along the longitudinal axis of the leaf 301. Two oblong holes 304 and 305 at the other end of the leaf are positioned astride the longitudinal axis and have their long dimension oriented perpendicular to the longitudinal axis crosswise across the narrow dimension of the leaf. The leaf 401 shown in FIG. 4 has two oblong holes 402 and 403 positioned astride the longitudinal axis of the leaf at one end. Two circular holes 405 and 406 on opposite sides of the longitudinal axis are provided at the opposite end.

Figure 5:
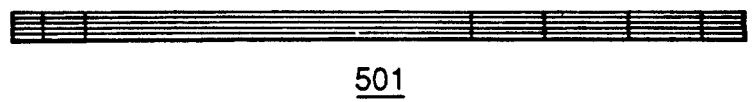
FIG. 5 is an end view of a stack of laminations to form a flexible bus bar.

The leaves are staked to provide the necessary current carrying capacity. The illustrative stack of leaves 501 in FIG. 5 is a stack formed from the leaves of FIG. 4. The stack includes the number of leaves to provide the necessary current carrying cross section area. The stack of leaves is loose or unattached mechanically to each other. This is necessary to secure the necessary flexibility to permit the connecting of the flexible bus bar to components in differing planes of connections.

Figure 6:
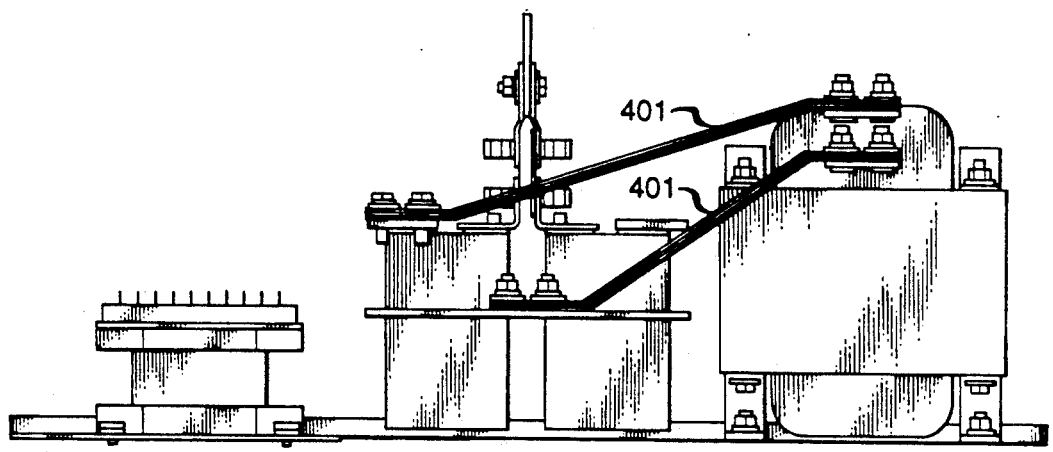
FIG. 6 is a planar view of an application of the flexible bus bars to provide heavy current carrying connections between bulk processor components.

An example of these differing planes of connections is shown in the FIG. 6 in which the laminated bus bars 401, as shown in FIG. 4, are shown interconnecting two components of the bulk rectifier of FIG. 1. In accord with the invention, each flexible bus bar comprises a plurality of stacked leaves formed from leaves such as shown in the FIG. 3. The flexible nature of the bus bars is clearly illustrated in the FIG. 6 example. The flexible shape is attained when the flexible bus bars are bolted to the terminals or connecting points of the components during construction of the bulk rectifier. Hence it is readily apprarent that the varying differing planes and angles of terminal connections may be readily accommodated by a stack of conducting leaves forming a flexible bus bar. The flexible bus bars are utilized without an insulative covering, in contrast to the insulated stranded cable of the prior art, and hence have superior heat exchange properties. Hence the flexible bus bar will operate at a lower temperature than a stranded cable carrying a like current load.

I claim:

1. A high power bulk power processing rectifier comprising:

a plurality of components to be interconnected including, high power ferro transformers, inductors, capacitors and interconnecting current carrying busses;

the components including conductor connection bolts to which current carrying conductors are attached to interconnect at least two components;

the at least two components having the conductor connection bolts of each component of the at least two components occurring on different planar levels from each other;

wherein the improvement comprises:

at least one flexible bus bar interconnecting the at least two components, the flexible bus bar comprising a selected number greater than one of thin conducting leaves stacked on top of and directly contiguous to each other providing sufficient current carrying cross section and each thin conducting leave having a first and second pair of apertures located at opposite ends of each leave, respectively, to facilitate bolt connections to the conductor connection bolts;

all of the thin conducting leaves of the flexible bus bar being bolted through the paired apertures at each end to the at least two components each having a connection location which lie in differing planes with respect to each other, the flexible bus bar flexing and assuming a bending non planar contour when bolted to differing planes of the connection locations of the at least two components.

2. A high power bulk power processing rectifier as claimed in claim 1 and further comprising:

the first and second pairs of apertures including, a first aperture pair at one end of the flexible bus bar having a first and second aperture lying along and astride a longitudinal axis of the flexible bus bar, and the second aperture pair at an opposite end of the flexible bus bar having a first and second aperture positioned on opposing sides of the longitudinal axis.

3. A high power bulk power processing rectifier as claimed in claim 1 and further comprising:

the first and second pairs of apertures at each end of the flexible bus bar having a first and second aperture lying along and astride a longitudinal axis of the flexible bus bar.

4. A high power bulk power processing rectifier as claimed in claim 1 and further comprising:

the leaves of the flexible bus bar being constructed of a highly conductive soft copper material.

5. A high power bulk power processing rectifier as claimed in claim 1 and further comprising:

the bending contour assuming a substantially continuous smooth curve from one component to another component.

6. A high power bulk power processing rectifier comprsing:

a supporting cabinet including a first and second ferro transformer having conductor connection apparatus and being located in a bottom of the cabinet, a plurality of inductors in a top portion of the cabinet each having conductor connection apparatus, and a central bus ascending vertically in the cabinet, first and second flexible bus bars for connecting the conductor connection apparatus of the ferro transformers to the central bus, and third and fourth flexible bus bars for connecting the conductor connection apparatus of the inductors to the central bus;

wherein each flexible bus bar includes:

a plurality of thin conducting leaves stacked on top of and directly contiguous to each other and having a sufficient number of individual thin conducting leaves to attain a desired current carrying total cross section and having a a first and second pair of apertures located at opposite ends of each leaf, respectively, to facilitate bolt connections to the conductor connection apparatus of the ferro transformers and to the conductor connection apparatus of the inductors and to the central bus by bolt mechanisms, the first, second, third and fourth flexible bus bars being connected to the central bus and to the first and second ferro transformers, and the first and second inductors respectively, and all of the thin conducting leaves at each of the first, second, third and fourth flexible bus bars are each dedicated to connecting two end locations, and the leaves deformed by the connection into a non planar profile.

7. A high power bulk power processing rectifier as claimed in claim 6 and further comprising:

the first and second pairs of apertures of the first and second flexible bus bars including, a first aperture pair at one end of the flexible bus bar having a first and second aperture lying along and astride a longitudinal axis of the flexible bus bar, and the second aperture pair at an opposite end of the flexible bus bar having a first and second aperture positioned on opposing sides of the longitudinal axis.

8. A high power bulk power processing rectifier as claimed in claim 6 and further comprising:

the first and second pairs of apertures at each end of the third and fourth flexible bus bar having a first and second aperture lying along and astride a longitudinal axis of the flexible bus bar.

9. A high power bulk power processing rectifier as claimed in claim 6 and further comprising:

the leaves of the flexible bus bar being constructed of a highly conductive soft copper material.

10. A high power bulk power processing rectifier as claimed in claim 6 and further comprising:

the bending contour assuming a substantially continuous smooth curve from one component to another component.

* * * * *